Sept. 4, 1956 R. M. HELLER 2,761,349
SHEET METAL NUT HAVING INSULATING AND
SEALING MATERIAL ATTACHED THERETO
Filed Dec. 29, 1952 2 Sheets-Sheet 1
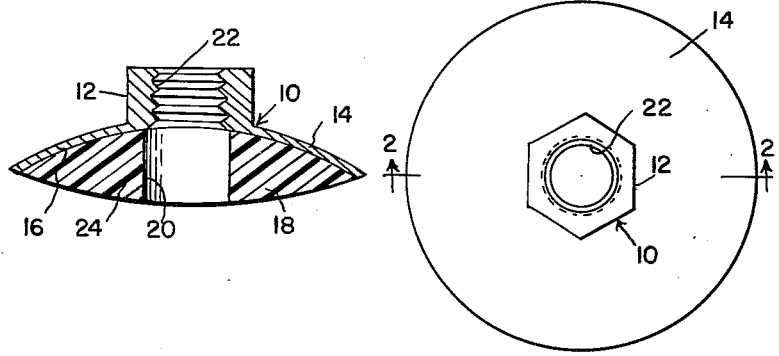
FIG.1.
FIG.2.
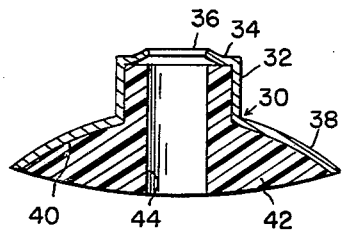
FIG.3.
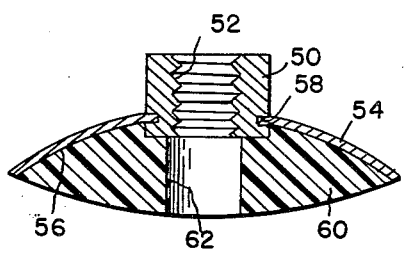
FIG.4.
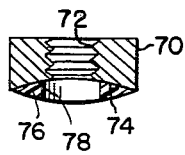
FIG.5.
*INVENTOR.*
ROBERT M. HELLER
BY Whittemore,
Hulbert & Belknap
ATTORNEYS Sept. 4, 1956

R. M. HELLER 2,761,349

SHEET METAL NUT HAVING INSULATING AND
SEALING MATERIAL ATTACHED THERETO

Filed Dec. 29, 1952

*INVENTOR.*
ROBERT M. HELLER
BY Whittemore,
Hulbert & Belknap
ATTORNEYS

United States Patent Office 2,761,349
Patented Sept. 4, 1956

2,761,349

SHEET METAL NUT HAVING INSULATING AND SEALING MATERIAL ATTACHED THERETO

Robert M. Heller, Birmingham, Mich.

Application December 29, 1952, Serial No. 328,483

1 Claim. (Cl. 85—32)

The present invention relates to a nut or fastener, and more particularly, to a nut specifically modified to operate as an insulating nut, a sealing nut, and a lock nut.

It is an object of the present invention to provide a nut or fastener comprising a body having secured thereto as a unitary part thereof plastic material disposed at one end of the body and adapted to be compressed between the body and the surface with which the body is engaged to provide insulation, sealing, and to serve as means for locking the body in place.

It is a further object of the present invention to provide a nut comprising a nut body including a recessed portion, and a readily deformable or distortable plastic material received within the recess, the plastic material having an opening therethrough in alignment with the bolt engaging opening in the nut body.

It is a further object of the present invention to provide a nut having at one side thereof deformable or distortable plastic material provided with an opening therethrough in alignment with the thread engaging opening in the nut.

It is a further object of the present invention to provide a nut comprising a nut body having an outwardly extending skirt shaped to provide a recess at one end of the nut body, deformable plastic material in the recess.

Other objects and features of the invention will become apparent as the description proceeds, especially when taken in conjunction with the accompanying drawings, wherein:

Figure 1 is a plan view of a nut constructed in accordance with the present invention.

Figure 2 is a section on line 2—2, Figure 1.

Figure 3 is a sectional view similar to that of Figure 2, showing a different embodiment of the invention.

Figure 4 is a sectional view similar to that of Figure 2, showing yet another embodiment of the present invention.

Figure 5 is a sectional view similar to that of Figure 2, showing yet another embodiment of the present invention.

Figure 6:
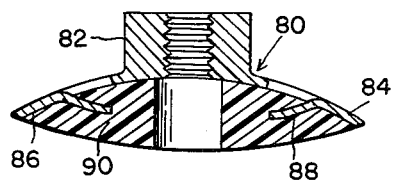
Figure 6 is a sectional view similar to that of Figure 2, showing yet another embodiment of the present invention.

Referring now to Figures 1 and 2 there is illustrated a nut comprising a nut body 10 including a threaded portion 12 of external polygonal configuration and an outwardly flared skirt 14 shaped to provide an outwardly concave recess 16 at one end of the nut body. Located within the recess 16 and permanently secured to the inner concave surface of the recess 16 is plastic material 18. The outwardly flared skirt may have some resilience so that as pressure is applied by tightening the nut on a bolt or the like, pressure is first applied to the plastic material and if sufficient pressure is applied some displacement of the skirt may result. The plastic material 18 is provided with an opening 20 in alignment with the threaded opening 22 of the nut body. The internal diameter of the opening 20 may be somewhat smaller than the internal diameter of the threaded portion to insure tight sealing with a bolt to which the nut is secured. However, the opening may if desired be larger than the threaded opening 22 and compressible to establish a sealing condition with respect to the bolt. Alternatively, the opening may be still larger so that in compressed condition it operates as a seal between the nut body and the engaged surface without however engaging the threads of the bolt to which the nut is secured.

The plastic material is a relatively soft, readily deformable or distortable plastic material. Among materials suitable for this purpose are polyvinyl chloride plastics, vinyl plastisols, and rubber or rubber-like materials.

The outer surface 24 of the plastic material 18 is outwardly convex as illustrated. Conveniently, the plastic material may be introduced into the recess 16 with the nut body inverted from the position shown in Figure 2 and with a core element occupying the space conforming to the opening 20. The plastic material may be provided in a quantity just sufficient to fill the upwardly open recess and may be provided with a specific foaming agent such for example as soda. Thereafter, the assembly may be heated, and due to the foaming agent the plastic material will be expanded to the outwardly concave configuration illustrated. At the same time the application of heat will result in a cure of the plastic material and accordingly for this purpose it is preferred to use a thermo-curing plastic. At the same time, adhesion between the inner surface of the plastic material and the concave surface of the recess 16 will be effected.

Alternatively, the plastic material carried by the nut body may assume its outwardly convex shape so as to extend beyond the portions of the nut body as a result of surface tension of substantially liquid plastic material prior to a setting or curing operation. Thus, for example, if an excess quantity of plastic material in substantially liquid phase is introduced into the nut body illustrated in Figure 1, while the nut body is disposed with the concave surface 16 of the skirt upwardly, it will be appreciated that due to surface tension the plastic material will assume a shape having an upwardly convex surface which when cured will produce the article illustrated in Figure 2.

In like manner, it will be appreciated that if it is desired to shape the outer surface of the plastic material for cooperation with particular surfaces on an article with which the nut is to be engaged, this may be accomplished by the use of a suitable die for shaping the plastic material. The foregoing remarks regarding the manner of producing the outwardly convex or particularly shaped surface of the plastic material will of course apply with equal force to the embodiments of the invention subsequently to be described.

The nut body illustrated in Figure 2 may be produced by a suitable stamping or spinning operation.

Referring now to Figure 3, there is illustrated another embodiment of the present invention. In this case the nut body is illustrated generally at 30 and comprises a neck portion 32 having a suitable outward polygonal configuration. The neck portion 32 is partially closed by a transverse end wall 34 having an opening 36 therein, the edges of the opening being cut and bent as is well understood in the art to cooperate with threads of a bolt. At the opposite end of the neck portion 32 there is provided an integral outwardly flaring skirt 38 which is shaped to provide an inwardly concave recess 40. The entire interior of the nut body 30 is filled with plastic material 42, the plastic material extending within the neck portion 32 to the transverse wall 34. The plastic material 42 is provided with an opening 44 in alignment with the opening 36 in the nut body. The opening 44 may be somewhat smaller in diameter than the opening 36 so as to form an adequate seal in conjunction with a bolt to which the nut is threaded or larger to provide a lead for a bolt.

Referring now to Figure 4 there is illustrated another embodiment of the present invention. In this case there is provided a nut body 50 of conventional polygonal outline having a threaded opening 52 extending from end to end thereof. Adjacent one end of the nut body 50 there is provided a skirt 54 which extends outwardly and is shaped to provide an outwardly concave recess 56. The skirt 54, as illustrated in Figure 4, may be a separate element the inner edge of which is received within a groove 58 formed adjacent one end of the nut body 50.

Received within the concave recess 56 is plastic material 60 having an opening 62 therethrough in alignment with the threaded opening 52 in the nut body. Again, the diameter of the opening 62 may be somewhat less than the diameter of the threaded opening 52 so as to provide an adequate seal in conjunction with a bolt to which the nut is threaded, or larger than said threaded opening.

Referring now to Figure 5, there is illustrated another embodiment of the present invention. In this case a nut body 70 is provided having a threaded opening 72 therethrough. One end of the nut body is formed with a concave recess 74 therein and this recess receives the plastic material 76, which again, is provided with an opening 78 in alignment with the threaded opening 72.

Referring now to Figure 6 there is illustrated another embodiment of the present invention. In this case the nut body 80 includes a polygonal portion 82 provided with an outwardly extending skirt 84 which is shaped to a concavo-convex configuration and presents an outwardly directed concave surface 86. The skirt 84 is provided with a plurality of struck out elements 88. The plastic material, as indicated at 90, is provided at the concave side of the skirt and is retained in place by mechanical engagement between the plastic material and the struck out elements 88 as illustrated in the figure.

Figure 7:
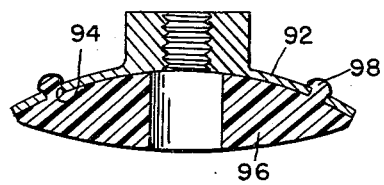
Figure 7 is a sectional view similar to that of Figure 2, showing still another embodiment of the present invention.

Referring now to Figure 7 there is illustrated yet another embodiment of the present invention in which the concavo-convex skirt of a nut body is illustrated at 92 and is provided with a plurality of openings 94. The plastic material as indicated at 96, is provided within the concave receptacle provided by the skirt and is mechanically retained in position by buttons 98 which extend through the openings 94.

Figure 8:
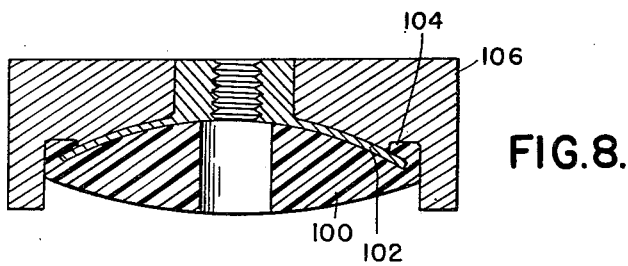
Figure 8 is a sectional view similar to that of Figure 2, showing yet another embodiment of the present invention.

Alternatively, as illustrated in Figure 8, the plastic material 100 may be provided to fill and extend beyond the receptacle provided by a concavo-convex skirt 102 of a nut body. In this case however, the plastic material is shaped to extend around the edge of the skirt 102 and to include a portion 104 overlying the rear edge portion of the skirt so as to effect a mechanical interlock between the plastic material and skirt. In this figure a mold is indicated at 106 which may be employed to shape the plastic material as illustrated in the figure.

Figure 9:
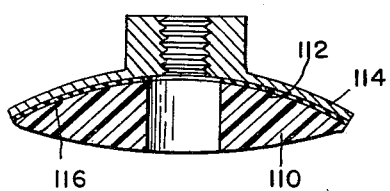
Figure 9 is a sectional view similar to that of Figure 2, showing yet another embodiment of the present invention.

Referring now to Figure 9 the plastic material, as indicated at 110, may be a unitary or integral part of the nut assembly as a result of being bonded to the concave surface 112 of a concavo-convex skirt 114 by means of suitable bonding or adhesive material indicated at 116.

Figure 10:
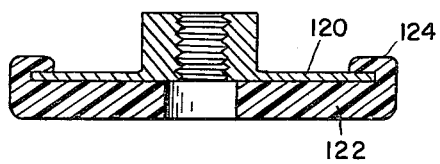
Figure 10 is a sectional view similar to that of Figure 2, showing still another embodiment of the present invention.

Referring now to Figure 10 there is illustrated another embodiment of the present invention in which the skirt 120 is illustrated as planar, and in this case the plastic material 122 may be a unitary or integral part thereof as a result of a mechanical interlock. In the figure the mechanical interlock is illustrated as being provided by a portion 124 of the plastic material which extends around an edge of the skirt 120 and engages the rear edge portion thereof as illustrated. It will of course be appreciated that the plastic material instead of being connected to the planar sheet 120 as illustrated in Figure 10, may be secured thereto by an adhesive as illustrated in Figure 9, or as a result of the formation of projecting elements similar to those illustrated at 88 in Figure 6.

It will be observed that in all cases there is provided in association with a body a plastic material which extends outwardly beyond one end of the body so as to engage a surface against which the nut is clamped.

It will thus be seen that the plastic material, which is an integral and permanent part of the nut assembly, serves a dual sealing effect in that it provides an adequate seal with the threads of a bolt associated with the nut, and also is adapted to be pressed directly against a surface with which the nut assembly is engaged. The nut has the additional function of operating as a lock nut, since the plastic material firmly engages the threads of a bolt and tends strongly to prevent loosening of the nut from vibration or other causes.

The nut performs other functions in that it provides a measure of insulation and prevents direct mechanical contact between the metallic portions of the nut body and the surface with which the nut is engaged. It thus serves as an insulating cushioned surface to dampen vibration, retard corrosion, and provide a locking function.

The plastic material referred to is yieldable and preferably somewhat resilient so that it performs the additional function of preventing rattling eve through the nut becomes somewhat loosened during service.

While the invention is illustrated as applied to nut bodies, it will be apparent that it is equally applicable to other fasteners, such for example as the heads of bolts, clips, or the like.

The drawings and the foregoing specification constitute a description of the improved insulating and sealing nut in such full, clear, concise and exact terms as to enable any person skilled in the art to practice the invention, the scope of which is indicated by the appended claim.

What I claim as my invention is:

A new article of manufacture comprising a nut formed entirely of sheet metal and comprising a hollow neck portion having a transverse wall at one end, said wall having a central opening the edge of which is shaped to have threaded engagement with a threaded bolt, an integral thin flexible spherically curved concavo-convex skirt portion flaring outwardly from the other end of said neck portion, a sealing member formed of deformable material comprising a double convex portion having spherically curved end surfaces, and an elongated neck portion extending from one side of said double convex portion axially therefrom, said sealing member having a centrally located axially extending bolt-receiving opening, said sealing member being fixed within said nut, said neck portion of said sealing member fitting within the hollow neck portion of said nut and the double convex portion of said sealing member fitting within the concave side of said skirt portion, the edge of said double convex portion extending to the edge of said skirt portion, the outer convex surface of the double convex portion of said sealing member being located entirely beyond the plane containing the edge of said skirt portion whereby minimum deformation thereof in use establishes a sealed zone adjacent and surrounding the bolt-receiving opening.

References Cited in the file of this patent

UNITED STATES PATENTS

| | | |
|---|---|---|
| 952,507 | Burns | Mar. 22, 1910 |
| 1,016,746 | Herzog | Feb. 6, 1912 |
| 1,208,620 | Moser | Dec. 12, 1916 |
| 1,636,135 | Hughes | July 19, 1927 |
| 1,814,502 | Barwood | July 14, 1931 |
| 1,936,113 | Jelliffe | Nov. 21, 1933 |
| 2,054,965 | Clo | Sept. 22, 1936 |
| 2,199,647 | Mueller | May 7, 1940 |

FOREIGN PATENTS

| | | |
|---|---|---|
| 440,906 | France | May 14, 1912 |
| 569,550 | Great Britain | May 29, 1945 |
| 746,092 | France | Feb. 27, 1933 |
| 823,368 | Germany | Dec. 3, 1951 |